United States Patent [19]

Eaton

[11] 4,093,563

[45] June 6, 1978

[54] RESILIENT MATERIAL WHICH IS ELECTRICALLY CONDUCTIVE UNDER PRESSURE

[76] Inventor: Manford Leslie Eaton, 1 rue Fulton, Paris 13eme, France

[21] Appl. No.: 616,054

[22] Filed: Sep. 23, 1975

[30] Foreign Application Priority Data

Sep. 30, 1974 France .................................. 74 32907

[51] Int. Cl.$^2$ ............................................. H01B 1/02
[52] U.S. Cl. .................................... 252/513; 252/512; 252/514
[58] Field of Search ............... 252/514, 513, 511, 512; 338/114; 260/37 M, 5 B

[56] References Cited

U.S. PATENT DOCUMENTS

| | | | |
|---|---|---|---|
| 3,583,930 | 6/1971 | Ehrreich et al. | 252/514 |
| 3,609,104 | 9/1971 | Ehrreich et al. | 252/512 X |
| 3,875,434 | 4/1975 | Harden et al. | 338/114 X |
| 3,918,020 | 11/1975 | Durocher | 252/511 X |

*Primary Examiner*—Leland A. Sebastian
*Assistant Examiner*—E. Suzanne Parr
*Attorney, Agent, or Firm*—Flynn & Frishauf

[57] ABSTRACT

A two-compound composite material becoming electrically conductive under a pressure applied thereupon comprising a non-corrosive thixotropic polymer having definite characteristics, said polymer being mixed with metallic particles.

16 Claims, 13 Drawing Figures

RESILIENT MATERIAL WHICH IS ELECTRICALLY CONDUCTIVE UNDER PRESSURE

BACKGROUND OF THE INVENTION

The present invention concerns composite, flexible, resilient materials which contain electrically conductive particles, and more specifically, composite materials which behave as electrical insulators when the pressure on them is less than a certain amount and which become conductive when the pressure is increased above this level. Even more specifically, the invention concerns materials of this type which require no chemical treatment of their constituents. The invention also concerns various industrial applications of the materials.

Flexible and resilient materials which are electrically conductive even in the absence of pressure on their surfaces have been known for a long time. If the surface of such a material is touched lightly with the electrodes of an Ohmmeter, the material is conductive as if it were a piece of metal. These materials consist of a low viscosity polymer (several thousand centipoises only) which is charged with spherical metal particles between 2.5 and 2500 microns in diameter. In general, these materials are made by using a metal powder of definite particle diameter such that the particles are maintained in contact with each other. In order for the particles to come into contact, the viscosity of the binder must be low enough or must become low enough, that the particles can sink towards the bottom of the binder when it is in its liquid state. In order for the entire mass of the composite material to be conductive the binder must be heavily charged with metallic particles. It is general practice to use particles whose surface is formed of a precious metal. The oxide layers which form on particles of common metals, because of corrosive solvents in the polymer, and the elevated cure temperatures prevent the particle to particle contact which is necessary for the material to be electrically conductive even when no pressure is applied to its surface.

If particles of a common metal are used, the material obtained is an insulator when no pressure is applied and becomes conductive only under pressure. When pressure is applied to the surface of the material, the oxide layers on the particles are broken and the material becomes conductive. However, a pressure sensitive material obtained in this way has several limitations. Such a material is not electrically stable because of the variations in the oxide layers and the resultant variations in the pressure required to render the material conductive. In general, the pressure required to render such a material conductive is quite high.

It is known that it is difficult to use metal particles having a form other than spherical in a low viscosity polymer to fabricate materials which are conductive even in the absence of pressure on their surfaces. For example, a low viscosity polymer charged with flake shaped particles is not electrically stable and is not, generally, electrically conductive in the absence of pressure on its surface. An exception to this is a low viscosity polymer which is subjected to strong thermal contraction during cure. However, this requires elevated temperatures.

There are conductive plastics which are resilient and flexible, and which behave as electrical insulators under low pressures but which become electrically conductive if the pressure is increased. However, these materials, even though they are electrically stable, use particles and binders which are chemically treated. These treatments produce intermediate semiconductor regions between the metallic particles and the binder. The use of chemical treatments is a disadvantage because it requires additional production processes which are costly. Another disadvantage of these materials is that the electrical behavior under pressure depends on the chemical processes during fabrication. Therefore, the entire mass of material has the same electrical behavior. There is no possibility of selective modification of various areas of the material after vulcanisation.

Until now, the preference has been to use materials which are electrically conductive even in the absence of pressure on their surface, rather than pressure sensitive materials, because of the problems of instability of the latter. Nevertheless, even though there are applications where it is desirable that the material be conductive even without pressing on its surface, this is most often a disadvantage. In the fabrication of keyboards and switches, for example, it is necessary to prevent the conductive material from creating a short circuit with the metallic contact points of the substrate except at those moments when pressure is applied to the key. This requires additional mechanical parts. Such a material is disadvantageous also when used as connectors of interconnection of electronic components or for devices designed to establish electrical contact with the output pins of circuits. Each piece of conductive material must be electrically isolated from all the others to prevent short circuits between them. There has been a need for a long time of flexible, resilient, materials which become conductive only under pressure; whose fabrication is simple; which exhibit stable electrical behavior; and whose characteristics can easily be modified over a wide range.

Paste-like adhesives which are electrically conductive when applied as films a few mils thick have also been known for a long time. These materials also use precious metal particles. Until now these materials have been used as adhesives to adhere conductive materials to substrates.

SUMMARY OF THE INVENTION

The materials, disclosed in this invention, avoid the problems enumerated above. In the invention described here it is possible to obtain a large range of materials whose electrical behavior can be varied solely by physical methods. The materials are stable, require no chemical treatments of their constituent parts, and do not depend on oxide layers on the metallic particles for their operation.

An object of the invention is to obtain materials having the following characteristics:

1. Flexible and resilient materials which are electrical insulators up to a certain pressure and which become electrically conductive when the pressure is increased beyond this point.

2. Materials whose electrical behavior is a function only of the physical characteristics of the components. That is to say that they require no chemical treatment of the components or chemical reaction between binder and metal particles.

3. Materials whose electrical behavior can be varied over a large range by varying the physical nature of the charge and of the binder.

4. Materials which consist in the simple mixing of only two components.

5. Materials in which the extend of the surface that becomes conductive under pressure can be varied by varying the physical nature of the binder.

6. Material whose electrical behavior under pressure can be modified, if desired, after vulcanisation by physical manipulations of the composite material.

7. Materials whose range of pressure between that necessary to make the material a non-insulator and that necessary to make the material highly conductive can be controlled.

8. Materials in which the permanence of the effects of pressure can be controlled. That is, materials which return to their insulating state after the pressure has been released, or if desired, materials which are insulators in the absence of a certain pressure, but which, after sufficient compression, become and remain highly conductive under very light pressures of a few tenths of a gram.

BRIEF DESCRIPTION OF THE DRAWINGS

The invention, as well as the details for the provision of a preferred embodiment, will be readily understood after consideration of the following detailed description and reference to the accompanying drawings, wherein.

DESCRIPTION OF THE PREFERRED EMBODIMENT

Figure 1:
FIGS. 1-8 show some forms of metallic particles used for the composite material of the present invention.
Figure 2:
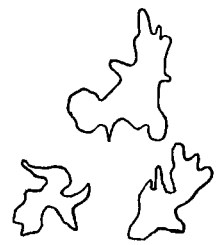
Figure 3:
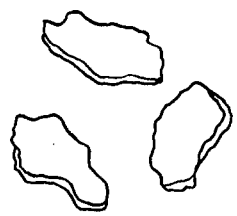
Figure 4:
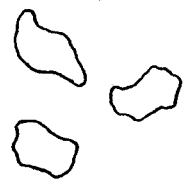
Figure 5:
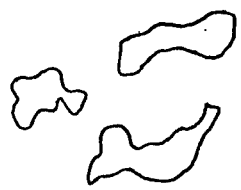
Figure 6:
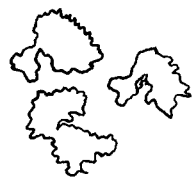
Figure 7:

The materials, which are the object of this invention consist in the simple mixing of a non-corrosive thixotropic polymer, type RTV (room temperature vulcanisation), of definite density, durometer, and shrinkage, with metallic particles of definite form (or forms), apparent density (or densities), flow rate (or flow rates), tapped density (or densities), average diameter (or average diameters), of diameter distribution (or distributions), and of specific area (or areas) in cm²/gram. The performances obtained are due solely to the physical characteristics of the thixotropic polymer and the metal particle charge. The only solvents used in the thixotropic polymer are those already present.

In order to obtain the performances which we have presented, the polymer must be thixotropic, with a viscosity of about 2 million centipoises, it must be non-corrosive, and of the type known as RTV. That is, whose vulcanisation takes place at ambient temperature. Thixotropic polymers which give off acetic acid during vulcanisation are usable only when the metallic particles are copper.

One of the advantages of the present invention is that precious metal particles, or particles plated with precious metals, are not required. One might think that the results obtained with particles of common metals would be due to oxide layers on the particles. However, as we will show in the examples presented later, similar results can be obtained with either precious or common metals. Since the binder used is non-corrosive and is vulcanised at room temperature, oxide layers do not easily form on the particles. As soon as the particles are incorporated in the binder they are protected even from the corrosive influences of the atmosphere. In typical application situations of these materials, their surfaces are placed in intimate contact with rigid conductive substrates. Once the material is installed, the polymer creates a sealed joint with the substrate. This protects the particles at the surfaces of the material from corrosion.

The present invention provides pressure sensitive composite materials which are resilient after vulcanization and prepared by admixing a polymer having specified characteristics with electroconductive particles of specified characteristics so that the particles are dispersed in the polymeric material. The said composite material may be formed utilizing as the resilient polymeric component thereof, a non-corrosive thixotropic silicone which polymerizes at ambient temperature.

The mechanisms by which the performances cited earlier are obtained is as follows: depending on the physical characteristics of the thixotropic polymer and the metallic particles, the particles assume a certain distance from each other in the binder. Because of the thixotropic nature of the binder the particles do not change position after mixing of the components. They remain suspended in the binder. If the particles are such that they become covered with the thixotropic polymer the resultant material is an insulator in the absence of pressure on its surface and becomes electrically conductive when the surface pressure is sufficient to make the particles pierce the thin layers of polymer which surround them and to come into contact. On the other hand, if the particles are such that they come into contact during the mixing, the resulting material is highly conductive even in the absence of pressure on its surface. Depending on the physical characteristics of the binder and the metallic particles a wide range of electrical behaviors can be obtained as we will see in the examples.

Generally, the resulting materials can withstand elevated voltages in their insulating state and high currents in their conductive state. Since the electrical conduction mechansim depends on the penetration of the metallic particles through the thin thixotropic polymer layers there is no arcing as the material passes from its insulating to its conductive state, and vice versa. In all cases where the material is an insulator in the absence of pressure on its surface, the electrical resistance is very high; many tens of Megohms for a thickness of 1 mm. In the states considered as highly conductive, the resistance of the material under pressure falls to a few tenths of an Ohm. The range of pressures between the insulating state and the conductive state can be wide or narrow depending on the characteristics of the binder, the charge, and the application conditions of the material.

In order to obtain the performances that we have cited earlier, the only methods used concern modifications of the physical characteristics of the metallic particles used as charge, and the physical manipulations of the material after vulcanisation.

Even though the materials, object of the invention, use particles having diameters between 0.7 micron and 2,500 microns their electrical behaviors are completely different from those obtained with polymers of low viscosity which as used are binders in classical materials. Moreover, in a low viscosity polymer, particle diameters in the range mentioned just above produce similar results no matter what diameter is used. In the materials of the present invention, in contrast, the electrical behaviors of the resulting materials can be quite different one from another depending on the diameters, the distribution of diameters, as well as the other physical characteristics of the metallic particles. More specifically, if all of the metallic particles in the thixotropic polymer are irregular fragments the resultant material is electrically conductive only under pressure. With such particles, the material is conductive only underneath the areas where the pressure is applied. In contrast, by using finely divided particles the resulting material becomes conductive under an area which is larger than that to which pressure is applied.

The relationships between the physical characteristics of the metallic particles and the characteristics of the thixotropic polymer are complex. For example, a metallic powder of atomic mass 107.868 (Ag) of irregular shape, of selected apparent density, used as charge for a thixotropic polymer of 2 million centipoises and density of 1.12 has an electrical behavior under pressure completely different with particles of about 500 microns that with particles of about 5 microns.

We will now present the physical characteristics of the thixotropic polymers, of the metallic powders, and the fabrication processes used.

THIXOTROPIC POLYMER: Short A Durometer of 15 to 50 after vulcanization; Density from 0.9 to 1.15 at 25° C; Viscosity of about 2 million centipoises; Shrinkage coefficient from 0 to 1% and preferably between 0.1% and 0.5. METALLIC PARTICLES: The form of the metallic particles is one of the characteristics defining the metallic particles.

Figure 8:
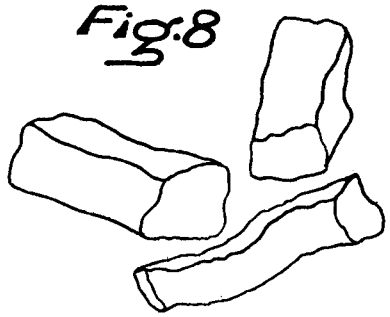

As shown in FIGS. 1–8, the form of the metallic particles may be angular (FIG. 1), dentritic (FIG. 2), flake or pellicular (FIG. 3), granular (FIG. 4), irregular (FIG. 5), porous or spongious (FIG. 6), spherical or spheroidal (FIG. 7) or acicular (FIG. 8). The forms shown in FIGS. 1–8 have been represented to avoid any possible ambiguity.

Other characteristics of the metallic particles are:
  Flow rate: 15 to ∞
  Apparent density: 0.2 to 6.0
  Tapped density: 0.5 to 6.0
  Average Diameter: 0.7 micron to 2,500 microns.
  Distribution of diameters: within the same range as the average diameters.
  Specific area: 1 to 850 cm$^2$/gram
  Atomic mass: 9.01 to 207.19

The choice of values for each of these characteristics determines the electrical behavior of the resulting material.

PRODUCTION OF COMPOSITION MATERIAL: Pastes, sheets, molding, extrusion, compression of material after vulcanisation.

Generally, with all other parameters fixed, a thixotropic polymer of low density, of relatively large shrinkage factor, and of low durometer value, produces a composite material which is more supple and which becomes conductive under lower pressures.

The effects of the physical characteristics of the metal particles on the electrical behavior of the composite materials is much more complex. Generally, the physical characteristics govern the type of dispersion and the physical and electrical reactions to pressures exercised on the material after vulcanisation.

By varying the elements mentioned just above we can obtain a wide range of materials having behaviors unknown until now. It is well known that spherical particles in a low viscosity polymer produce highly conductive materials even in the absence of pressure. It is also well known that flake shaped particles in such a binder have a tendency to become covered with polymer and thus the resulting material is not conductive unless pressure is applied. The results obtained by the present invention are different. In a thixotropic polymer, generally, granular or irregular particles produce materials which are conductive only under pressure while flake shaped particles produce materials which are highly electrically conductive even in the absence of pressure on their surfaces.

The charge of metallic powder can be varied between 20% and 90% by volume. However, charges between about 40 and 80% by volume are the most often employed. Generally, the larger the metallic particle charge, the lower the electrical resistance for a given pressure. It should be noted, however, that for charges greater than 50% by volume the nature of the metal powder charge and the binder characteristics are more important to the electrical behavior than the percentage charge of metallic particles. With a charge of granular or irregular particles, a thixotropic polymer does not become conductive over its entire surface in the absence of pressure even at a high percentage of metal powder charge. On the other hand, an identical charge of flake shaped particles produces a material which is highly conductive over a large surface even at very low pressures.

It is possible to use almost any metal powder as charge. Nevertheless, there are metals which are better adapted to such use than others. Of course, it is possible to use precious metals, or common metals plated with precious metals. However, the characteristics of the binder and the typical use conditions of the materials are such that the use of common metals is possible and obviously less expensive. It is advantageous, nevertheless, to use metals which form only thin oxide films on their surfaces because these metals remain in a stable state relatively free of oxides longer and cleaning of the particles, if it is done, before incorporating them in the binder and the cleaning of the material surfaces before utilisation is more easily accomplished than with other metals. Some metals that can be used are aluminum, nickel, copper, tin, and various alloys which are well suited for these uses.

We will now present several examples which will help clarify the results obtained by varying the physical nature of the binder, of the metallic particle charge, and of the production methods, as well as some industrial applications of the invention. Of course, the apparatus and methods disclosed are representative of certain aspects of the invention and are intended only as illustrations thereof.

EXAMPLE 1

30% by volume of an aluminum powder of high purity is mixed with 70% by volume thixotropic polymer RTV noncorrosive. The polymer has a density of 1.12 and a Shore A durometer of 33, shrinkage factor is about 0.2%. The metallic powder has an apparent density of 1.2. The average diameter of the particles is 500 microns and the distribution of diameters is from 45 to 700 microns with approximately 30% of the particles between 120 and 200 microns. The particles are irregular fragments. By lamination, a sheet is rolled to a thickness of 1.2 mm. The sheet is vulcanised without compressing it for 48 hours at room temperature.

Figure 9:
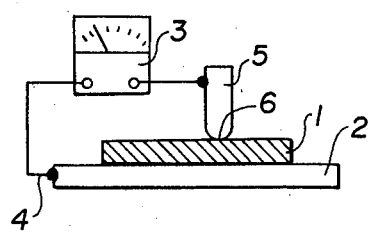
FIG. 9 shows how to measure the variation of resistance of a sheet of composite material made according to the present invention.

As shown in FIG. 9, the sheet then illustrated at 1 is placed on a rigid copper substrate 2. An ohmmeter 3 has an electrode 4 directly connected to the substrate 2, and the other electrode 5 is under the shape of a pencil having a diameter of 1 mm and a rounded tip 6 which is pressed against the sheet 1. By measuring the resistance between the electrodes 4 and 5 of the ohmmeter, it is found that the material is an insulator under small pressures. As the pressure of the rounded tip 6 of the electrode 5 on the sheet 1 is increased, the resistance passes from a very high value of many tens of megohms, through an unstable region, and enters into a low resistance state of a few tenths of an ohm.

EXAMPLE 2

A sheet of material is made as in the first example. After vulcanisation the sheet is compressed under considerable pressure several times in a press, then the two surfaces are burnished, then the surface of the material are cleaned with a solution of 4% by weight phosphoric acid. The experiment of the first example is repeated. It is found that the pressure required to make the material enter its low resistance state is less than in the first example and that the material is such more supple and resilient.

Figure 10:
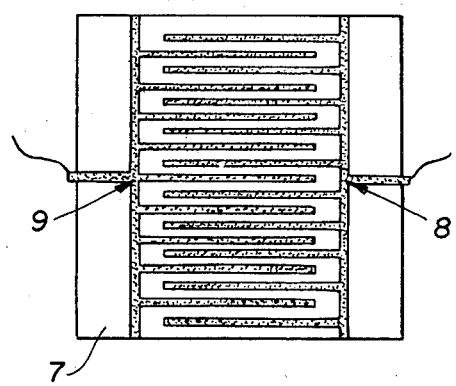
FIG. 10 shows a piece of a sheet of composite material placed on a printed circuit having two series of conducting elements.

As shown in FIG. 10, a piece of a sheet is cut and placed on a printed circuit 7 comprising two series of elements 8, 9 with twenty parallel paths per centimeter. The width of the paths and the spaces between them are equal. The first series of conducting element 8 comprises an even number of paths which are electrically connected together while the second series 9 comprises an odd numbered of paths which are electrically connected together. The even numbered paths are electrically insulated from the odd numbered paths. A sheet of material is placed on the printed circuit. It is found that in the absence of pressure on the sheet, the even numbered paths remain insulated from the odd numbered paths. Under slight pressure of a few dozen grams, with the finger, the material passes suddenly from a high resistance, through an unstable region, much more narrow than in the first example. The material enters into a state of very low resistance; the even paths and the odd paths become connected together electrically.

Figure 11:
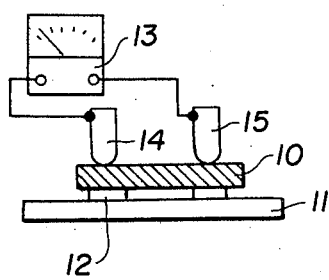
FIG. 11 shows how to measure the electrical connection between two conductors placed on a sheet of composite material.

As shown in FIG. 11, a piece of sheet material then illustrated at 10 is died-cut and placed on a printed circuit 11 having conductors 12 forming parallel paths 1 mm wide and spaced 1.7 mm from each other and insulated from each other. An ohmmeter 13 has its two electrodes 14, 15 pressed against the piece of sheet material 10 above two adjacent paths 12 of the printed circuit 11. By measuring the resistance between the electrodes 14, 15 of the ohmmeter 13, it is found that at all pressures, the two paths remain insulated from each other.

A hole is drilled in each printed circuit path such that a standard integrated circuit can be inserted. The sheet material is pierced with the leads of the integrated circuit and they are passed through the printed circuit board holes so that the composite material is in contact with the printed circuit paths. While pressing on the integrated circuit, the leads are bent on the non-copper side of the printed circuit board so that the integrated circuit is held in place. The result is that the electrical resistance between each component lead and the path directly underneath it is very low. The resistance between the paths is very high even though the sheet of material is in contact with all of the component leads. The material is conductive only underneath the area where pressure is applied.

Figure 12:
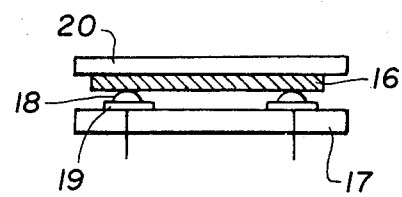
FIG. 12 shows how to electrically connect two printed circuits by means of a sheet of composite material.

Referring now to FIG. 12, there is shown a piece of composite material, then illustrated at 16 as placed on the first printed circuit 17, provided with metal bumps 18 on each path 19 of the printed circuit 17. A second printed circuit 20 is placed on a composite material 16 so that the conducting paths of the printed circuit 20 are in contact with the upper surface of the sheet of composite material 16. By measuring the resistance between the printed circuits 17 and 20, it is found that in the absence of pressure on the upper printed circuit the two printed circuits are insulated from each other. When a slight pressure is exercised on the upper printed circuit, the paths of the lower printed circuit become electrically connected to the paths of the upper printed circuit. The paths on each of the printed circuits do not become electrically connected together; they are connected together only if copper paths on the printed circuit short them together. By this method, it is possible to make connectors having many contacts and which perform complex interconnection functions.

EXAMPLE 3

20% by volume thixotropic polymer as in Example 1 is mixed with 80% by volume pure silver particles having an average particle diameter of about 5 microns and of granular form. By lamination, a sheet 1.2 mm thick is fabricated. The sheet is vulcanised without compressing it.

The sheet is placed on a copper substrate. One electrode from an Ohmmeter is connected to the substrate and the other is pressed against the sheet of material. The results are similar to those obtained with the material of example 1.

The sheet is placed on a printed circuit having 1 mm wide paths which are spaced 1.7 mm one from another as in example 2. One electrode of an Ohmmeter is connected to one path of the printed circuit and the other electrode (which is rounded and has a diameter of 1 mm) is pressed against the sheet material above the printed circuit path. The result is the same as that obtained with the material described in example 2.

When both electrodes are pressed against the material (when the two electrodes are above two adjacent printed circuit paths) the two paths become connected together under slight pressure; this is in striking contrast to the results obtained with the material described in example 2. By pressing on the sheet above paths more and more distant from the one to which the Ohmmeter electrode is connected it is found that as the distance between the two electrodes is increased the pressure necessary to make the material enter into its conductive state increases. Even when the two paths are separated by 2 cm from each other it is possible to obtain a low resistance under pressure. Further apart, low pressures are not obtained even at considerable pressures.

Using the sheet of this present example, a circle 7 mm in diameter is compressed in the middle of the sheet by pounding or with a press. The thickness of the compressed area returns to within a few percent of its thickness before compresion. It is found that the surface of the area of material which has not been compressed has not changed electrical behavior under pressure. However, the area which was compressed has become highly conductive, permanently, under very small pressures on its surface.

Using this selective compression technique, it is possible to obtain sheets of material having serveral different areas; those which require a few tenths of a gram only, others which require a few grams, and yet others which remain insulators under high pressures. After compression of the material, it is remarked that the pressure required between the two surfaces of the material to render it conductive has not changed. The effects of the compression take place only perpendicular to the applied pressure.

EXAMPLE 4

The thixotropic polymer of example 1 is charged with a metal powder of flake form having a composition of Cu/Ag with 10% silver. The diameter of the particles is 71 microns average and 180 microns maximum. Its apparent density is 0.9. The resistance of this powder is measured in its free state. The resistance is quite high. The thixotropic polymer is charged to 80% by volume with the metal powder. After mixing, the resulting paste is very smooth and highly electrically conductive. This paste is spread to a thickness of about 1 mm on a rigid insulating substrate. After vulcanisation the material is highly electrically conductive even in the absence of pressure on its surface. It is possible to obtain similar results with Cu/Sn. It is seen that the resistance in a free state of a metallic powder is not a conclusive test of its behavior in a thixotropic polymer.

Figure 13:
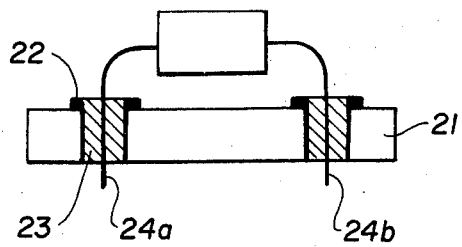
FIG. 13 shows a printed circuit carrying an electric component hold by the composite material of the invention.

FIG. 13 shows a printed circuit 21 with metallized holes 22 which are filled with the paste as above prepared to form slugs of material 23. Then, the surfaces of the printed circuit 21 are rubbed with a cloth so that no paste will remain on the thereon circuit. After vulcanisation, the slugs of material 23 are pierced with the leads 24a, 24b of an electronic component 25 so that the component 25 is held in place by the composite material. By measuring the electrical resistance between the leads 24a and 24b and the corresponding metallized hole 22, it is found that the electrical resistance between each lead of the components and the metallized hole is very low; the electrical connection between the two being made by the composite conductive material.

EXAMPLE 5

Using the same powder as in example 1 its electrical resistance is measured in its free state. The resistance is very high; many Megohms per centimeter. The powder is cleaned using a 6% solution by weight of phosphoric acid. A thick mixture of powder is made with the solution. The chemical reaction gives off hydrogen vapors. The powder is dried by using acetone. The electrical resistance is again measured with the powder in its free state. The resistance has fallen to a relatively low value. The experiments of example 1 and 2 are repeated and it is found that the electrical comportment of the materials under pressure is similar in all cases. This proves that the electrical resistance of a powder in its free state is not indicative of its electrical behavior in a thixotropic polymer. It shows also that thin oxide layers which may form on the particles are not the mechanism by which the materials function.

EXAMPLE 6

Approximately 75% by volume of pure silver particles having an irregular form and an average diameter of 1,600 microns are mixed with 20% by volume of the same thixotropic polymer as in Example 1. The silver powder is highly electrically conductive in its free state. After vulcanisation of the composite material, it is seen that the material is electrically conductive only under pressure.

EXAMPLE 7

The metal powder of example 1 is mixed with a thixotropic polymer having a density of 1.05, and Shore A Durometer of 25, and a shrinkage of about 0.3%. The thixotropic polymer is charged to about 70% by volume with the powder. The experiments of examples 1 and 2 are repeated. It is found that the resulting material is more elastic, more supple, more resilient, and that it is conductive under smaller pressures, than the material of Example 1.

EXAMPLE 8

Using the same metal powder as in example 3, the polymer of example 7 is charged with about 75% by volume powder. The result is that the material is highly conductive even under very low pressures.

I claim:

1. A two component composite resilient material consisting essentially of between 10% and 80% by volume of a vulcanized one-phase homogeneous silicone polymer having a Shore A Durometer hardness of between 15 and 50, having dispersed therein between 20% and 90% of electroconductive metallic particles, and being electrically conductive under an applied pressure, said composite material being produced by admixing and then vulcanizing at room temperature and without applied pressure an admixture of room temperature vulcanization polymer having said particles dispersed therein;

said room temperature vulcanization silicone polymer being thixotropic and non-corrosive to said particles, having a density between 0.9 and 1.15 at 25° C, a viscosity of about 2,000,000 centiposes and being characterized by a shrinkage coefficient during vulcanization of between 0.1 and 0.5%; and said metallic particles comprise at least one metal selected from the group consisting of noble metals, aluminum, nickel, copper, and tin, and have an apparent density between 0.2 and 6.0, a tapped density between 0.5 and 6.0, a specific surface between 1 and 850 cm$^2$/gram, a flow rate between 15 and $\infty$, an average diameter between 0.7 micron and 2,500 microns, a diameter distribution within the same range, and an atomic mass between 9.01 and 207.19.

2. The composite material as set forth in claim 1, wherein the length of the electrically conductive path between two contacting points on one side of the body is changeable.

3. The composite material as set forth in claim 1, which is electrically conductive only in the direction perpendicular to the compression, and both the direction perpendicular to the compression and the direction transverse to the compression.

4. The composite material as set forth in claim 1, having an electrical resistance between two points on only one side of the body variably increasing as the distance between the points increases.

5. The composite material as set forth in claim 1, wherein the pressure which is necessary to make the material electrically conductivity adjustable over a wide range.

6. The composite material as set forth in claim 1, wherein the mass which becomes electrically conductive is selected from (i) the mass of the area where the compression is applied and (ii) all the mass between two spaced compression points on only one side of the material.

7. The composite material of claim 1 wherein said metallic particles are a noble metal.

8. The composite material of claim 7 wherein said metallic particles comprise between about 40% and 80% of said composition.

9. The composite material of claim 1 wherein said metallic particles comprise between about 40% and 80% of said composition.

10. The composite material of claim 9 wherein said polymer is a silicone.

11. The composite material of claim 10 wherein said metallic particles are a noble metal.

12. The composite material of claim 1 consisting essentially of 70% of said thixotropic polymer and 30% of aluminum powder and having a Shore A Durometer value of 33, said polymer before vulcanization having a density of 1.12 and a shrinkage of about 0.2 during vulcanization; and said aluminum powder having an apparent density of 1.2, an average particle diameter of about 500 microns, and particle diameters being between 45 and 700 microns.

13. The composite material of claim 1 consisting essentially of 20% of said thixotropic polymer and 80% of silver particles having an average particle diameter of about 5 microns.

14. The composite material of claim 1 containing 20% by volume of the thixotropic polymer and 80% by volume of copper-silver alloy particles containing 10% silver and having an average diameter of 71 microns with a maximum particle diameter of 180 microns and an apparent powder density of 0.9.

15. The composite material of claim 1 consisting essentially of 70% of said thixotropic polymer and 30% of aluminum powder and having a Shore A Durometer value of 25, said polymer before vulcanization having a density of 1.05 and a shrinkage of about 0.3 during vulcanization and said aluminum powder having an apparent density of 1.2, an average particle diameter of about 500 microns, and particle diameters being between 45 and 700 microns.

16. The composite material of claim 1 consisting essentially of 25% of said thixotropic polymer and 75% of silver particles having an average particle diameter of about 5 microns.

* * * * *